(12) United States Patent
Fan

(10) Patent No.: US 6,237,069 B1
(45) Date of Patent: May 22, 2001

(54) APPARATUS AND METHOD FOR TRANSFERRING DATA BETWEEN MEMORIES HAVING DIFFERENT WORD WIDTHS

(75) Inventor: Xue Feng Fan, Milpitas, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/222,548

(22) Filed: Dec. 29, 1998

(51) Int. Cl.[7] ........................................ G06F 12/00
(52) U.S. Cl. .................. 711/165; 711/171; 711/172; 711/202; 710/66; 710/127
(58) Field of Search ................... 710/65, 66, 68, 710/127; 711/105, 202, 212, 154, 165, 172, 171

(56) References Cited

U.S. PATENT DOCUMENTS 5,768,546 * 6/1998 Kwon .................................... 710/127

* cited by examiner

*Primary Examiner*—Do Yoo
(74) *Attorney, Agent, or Firm*—Pennie & Edmonds LLP

(57) ABSTRACT

An apparatus and method for transferring a block of data between a first storage area in a first, unpacked format and a second, narrower storage area in a second, packed format. The present invention includes a set of working registers to temporarily store and manipulate portions of the block of data as it is transferred between the first and second storage areas. By employing this set of working registers, the present invention transfers blocks of data between the first and second storage areas with a low latency and the highest possible throughput.

8 Claims, 9 Drawing Sheets

DRAM WRITE $S_{10L}(LSB) \equiv S_{1L}(LSB) \mid\mid S_{0L}(LSB)$ $S_{10R}(LSB) \equiv S_{1R}(LSB) \mid\mid S_{0R}(LSB)$

DRAM WRITE

DRAM READ

APPARATUS AND METHOD FOR TRANSFERRING DATA BETWEEN MEMORIES HAVING DIFFERENT WORD WIDTHS

BRIEF DESCRIPTION OF THE INVENTION

The present invention relates generally to digital circuit interfaces. More particularly, the present invention relates to an apparatus and method for transferring data between a memory in a processor having a first word width and a dynamic random access memory (DRAM) having a second, narrower word width.

BACKGROUND OF THE INVENTION

FIG. 1 is a diagrammatic view of a conventional digital system 100 including a processor 110 and a memory device 115. The processor 110, such as a digital signal processor (DSP), includes a processor memory 111 comprising a plurality of words having a first word width. The memory device 115, such as a dynamic random access memory (DRAM), comprises a plurality of words having a second word width. Data is transferred between the processor memory 111 and the memory device 115 under the control of the processor 110 via a data bus 116. In many digital systems, the processor memory 111 and the memory device 115 have different word widths such that for data to be transferred between the two memories, the data must first be converted from one word width to the other. In the digital system 100 illustrated in the figure, the processor memory 111 has a 24-bit word width while the memory device 115 has a narrower 16-bit word width.

FIG. 2 illustrates the problem of transferring data between the processor memory 111 and the memory device 115 for data in a digital multichannel (e.g., stereo) format. In this example, data is transferred between the processor memory 111 and the memory device 115 in 96-bit blocks. Because the word widths of the processor memory and the memory device are different, a block of data is stored in a first, unpacked format in the processor memory and in a second, packed format in the memory device to conserve space. Therefore, when transferring a block of data between the processor memory 111 and the memory device 115, the data must be converted from the unpacked format to the packed format or vice versa. Unfortunately, in the prior art, this conversion process degrades system performance by increasing the latency and/or decreasing the throughput of the block transfer.

In view of the shortcomings of prior art methods for data transfer, it is an object of the present invention to provide an apparatus and method for transferring data between memories having different word widths that provides a low latency and a high throughput.

SUMMARY OF THE INVENTION

The present invention is an apparatus and method for transferring a block of data between a first storage area in a first, unpacked format and a second storage area in a second, packed format. The first format consists of a plurality of $w_1$-bit wide words while the second format consists of a plurality of $w_2$-bit wide words, where $w_1 > w_2$. The first and second storage areas may comprise first and second memories having word widths of $w_1$ bits and $w_2$ bits, respectively. The apparatus of the present invention includes: (1) a plurality of working registers, each working register having a word width of at least $w_2$ bits, (2) a data routing circuit coupled to the first storage area, the second storage area and the working registers to route the block of data therebetween and (3) a control circuit coupled to the first storage area, the second storage area, the working registers and the data routing circuit to control the transfer of the block of data between the first and second storage areas. When transferring the block of data from the first storage area to the second storage area, the data routing circuit and the control circuit are jointly configured to: (1) concurrently transfer a first portion of a first word from the first storage area to a first location in the second storage area and a second portion of the first word from the first storage area to a first working register and (2) transfer both a portion of a second word from the first storage area and the contents of a portion of the first working register to a second location in the second storage area. When transferring the block of data from the second storage area to the first storage area, the data routing circuit and the control circuit are jointly configured to transfer the contents of both a second working register and a portion of a third working register to a location in the first storage area.

The method of the present invention includes two embodiments: a first embodiment for transferring a block of data from the first storage area in the first format to the second storage area in the second format and a second embodiment for transferring a block of data from the second storage area in the second format to the first storage area in the first format. The first embodiment of the method includes at least the following steps: (1) transferring a first portion of a first word from the first storage area to a first location in the second storage area, (2) concurrently transporting a second portion of the first word from the first storage area to a first working register and (3) moving both a first portion of a third word from the first storage area and the contents of a portion of the first working register to a third location in the second storage area. The second embodiment of the method includes at least the following steps: (1) transferring a first word from the second storage area to a first working register, (2) transporting a third word from the second storage area to a third working register and (3) moving the contents of both the first working register and a first portion of the third working register to a first location in the first storage area.

The apparatus and method of the present invention transfers blocks of data between the first and second storage areas with a low latency and a high throughput. The present invention achieves this by using the set of working registers to temporarily store and manipulate portions of the blocks of data as they are being transferred between the first and second storage areas.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
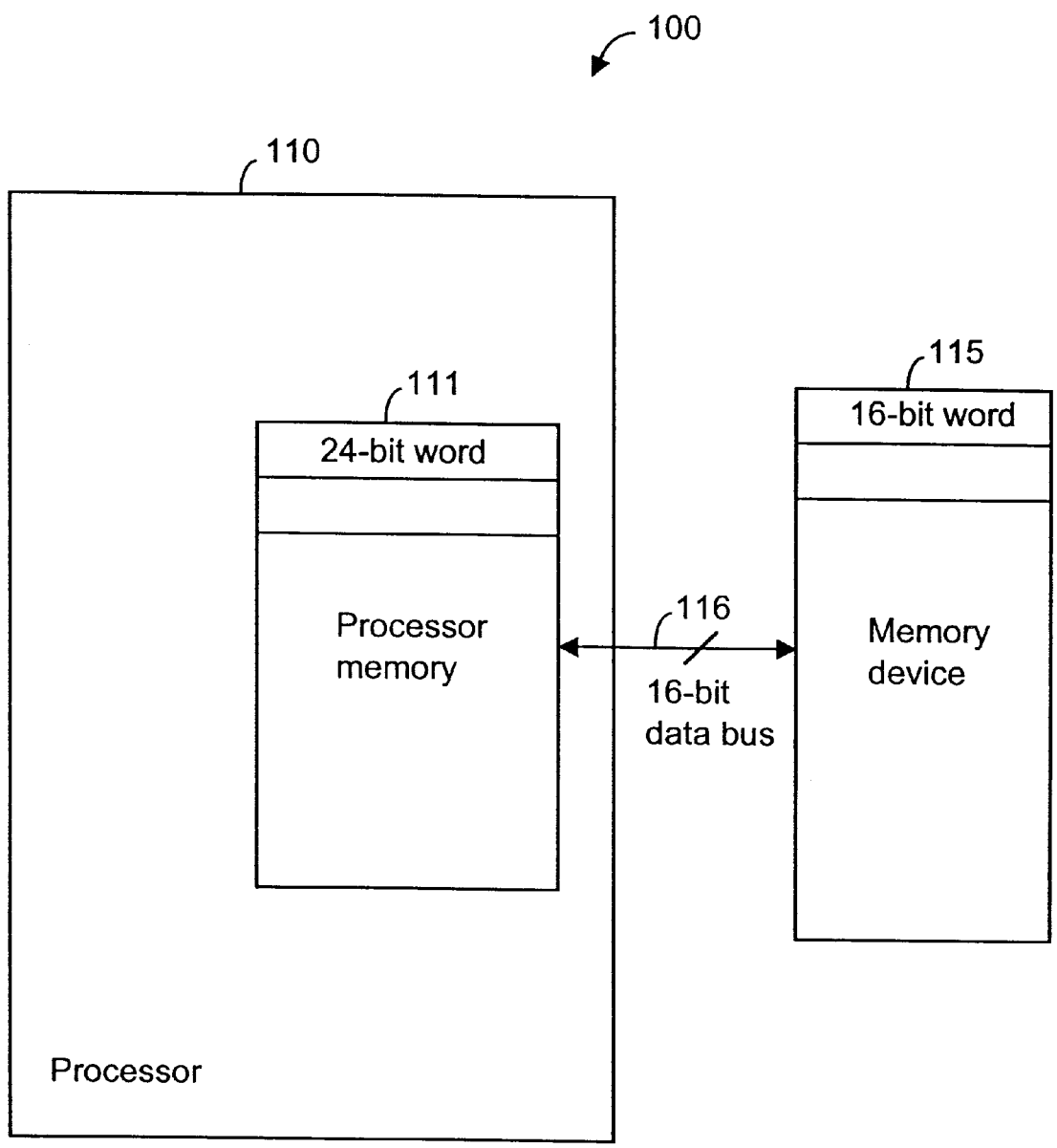
FIG. 1 is a diagrammatic view of a conventional digital system including a processor with an internal memory and a memory device.
Figure 2:
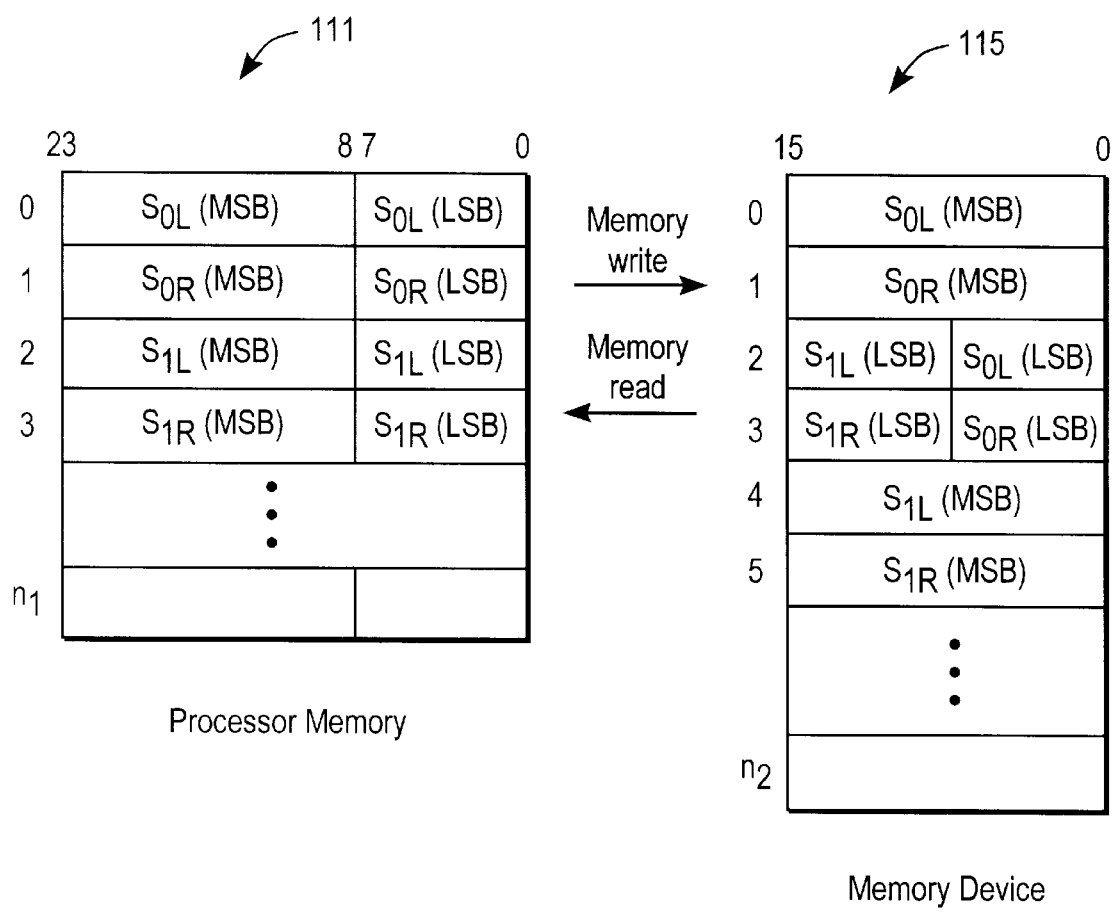
FIG. 2 is a diagrammatic view of a block of data in the Dolby Digital AC-3 format stored in the processor in a first, unpacked format and stored in the memory device in a second, packed format.
Figure 3:
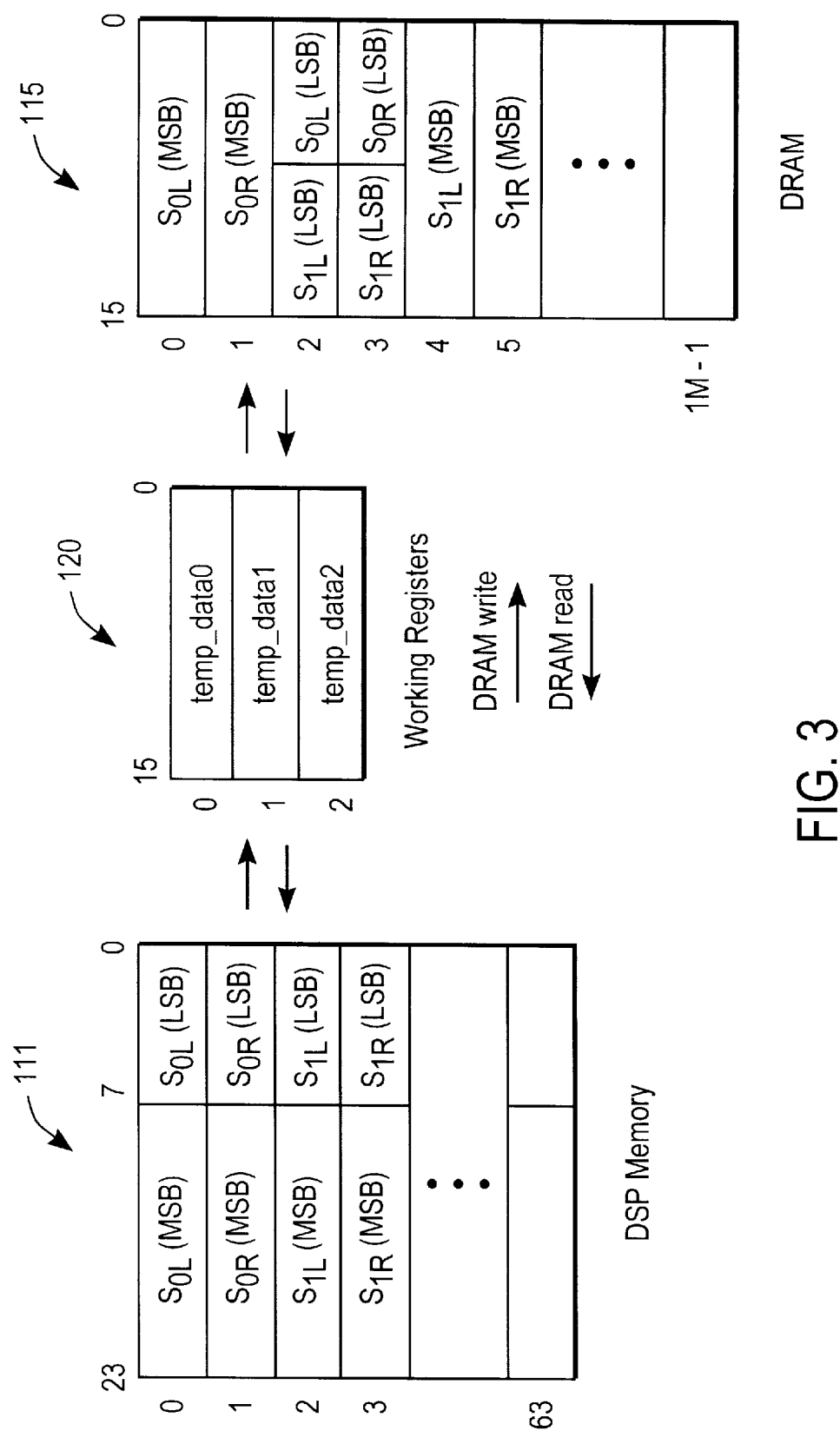
FIG. 3 is a diagrammatic view of the transfer of a block of data in the Dolby Digital AC-3 format between a DSP memory and a DRAM in accordance with the present invention.

FIG. 3 is a diagrammatic view of a DSP memory 111, a DRAM 115 and a set of working registers 120 in accordance with the present invention. The DSP memory 111 is a memory contained in a digital signal processor (DSP) 110 comprising 64 words with a word width of 24 bits. The DRAM 115 is a 1M×16 memory device comprising 1,048, 576 words with a narrower word width of 16 bits. In other embodiments of the present invention, the DSP memory 111 and the DRAM 115 may have other word widths.

The figure illustrates the transfer of a block of data in the Dolby Digital AC-3 format between the DSP memory 111 and the DRAM 115. The AC-3 format is used for encoding digital multichannel audio signals and consists of a sequence of 24-bit digital multichannel audio samples $S_0$, $S_1$, etc. Each sample contains six channels, including a 24-bit word for the left channel, $S_{XL}$, and a 24-bit word for the right channel, $S_{XR}$, where X=0, 1, etc. Data is transferred between the processor memory 111 and the memory device 115 in 96-bit blocks of data consisting of a two channel (e.g., left and right channel) portion of two samples, e.g., $S_1$ and $S_0$. Because the word widths of the processor memory 111 and the memory device 115 are different, a block of data is stored in a first, unpacked format in the processor memory and in a second, different format in the memory device 115. The unpacked format for storing the block of data in the processor memory 111 consists of four 24-bit wide words: $S_{0L}$, $S_{0R}$, $S_{1L}$ and $S_{1R}$. The packed format for storing the block of data in the memory device 115 consists of six 16-bit wide words: $S_{0L}$(MSB), $S_{0R}$(MSB), $S_{1L}$(LSB)$\|S_{0L}$(LSB), $S_{1R}$(LSB)$\|S_{0R}$(LSB), $S_{1L}$(MSB) and $S_{1R}$(MSB), where "MSB" stands for most significant bits and "LSB" stands for least significant bits. In this embodiment of the present invention, the word widths of the unpacked and packed formats equal the word widths of the DSP memory 111 and the DRAM 115, respectively. In other embodiments, however, the word widths of the unpacked and packed formats may be narrower than the word widths of the memories.

Still referring to FIG. 3, the set of working registers 120 is used for converting the block of data between the unpacked and packed formats as it is being transferred between the DSP memory 111 and the DRAM 115. Specifically, the working registers 120 are used to temporarily store and manipulate portions of the block of data so that the block may be converted from the unpacked format to the packed format or vice versa. The set of working registers 120, which is contained in the DSP 110, comprises three 16-bit wide registers: temp_data0, temp_data1 and temp_data2.

In one embodiment of the invention, the "1" least significant bits of a first word from a first memory with a word width of $w_1$ are transported to a first working register having a word width of $w_2$ bits, where $(w_1-w_2)<=1<=(w_2/2)$. In another embodiment of the invention, the "m" most significant bits of a first word from a first memory having a word width of $w_1$ bits are transferred to a first location in a second memory having a word width of $w_2$ bits, where $(w_1-w_2/2) <=m<=w_2$. In still another embodiment of the invention, a first storage area consists of four $w_1$-bit wide words and a second storage area consists of six $w_2$-bit wide words, where $(2/3* w_1)<=w_2<=w_1$.

Figure 4:
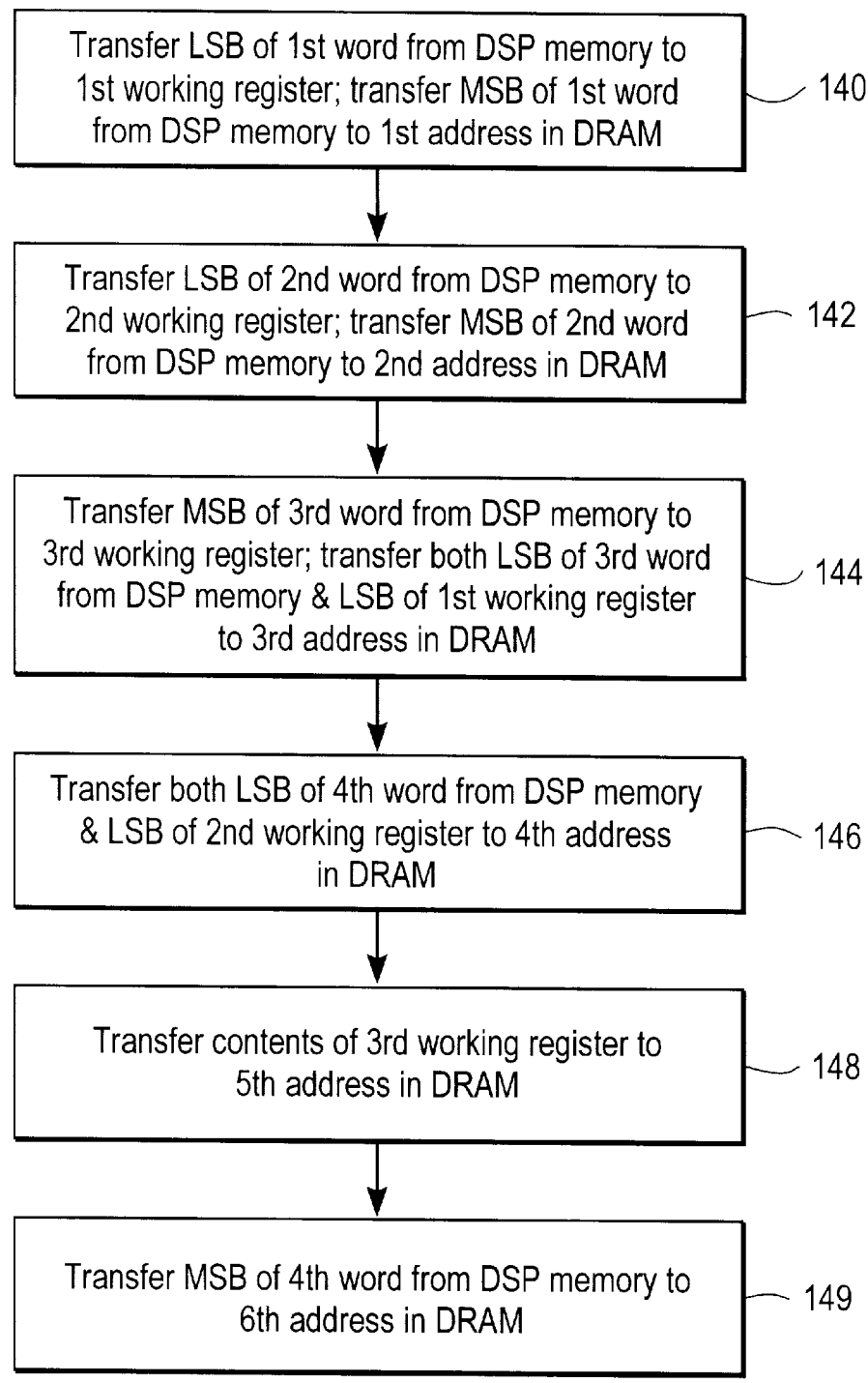
FIG. 4 is a flow chart of the steps in a method for transferring a block of data from the DSP memory to the DRAM in accordance with the present invention.

FIG. 4 shows the steps of a method for transferring a block of data in the AC-3 format from the DSP memory 111 to the DRAM 115 (i.e., a DRAM write) in accordance with the present invention. The method converts the block of data from the unpacked format to the packed format and comprises the following steps. First, transfer the least significant bits (LSB) of the first word ($S_{0L}$(LSB)) from the DSP memory to the LSB of the first working register (temp_data0) (step 140). Concurrently, transfer the most significant bits (MSB) of the first word ($S_{0L}$(MSB)) from the DSP memory to a first address (address 0) in the DRAM. In this and subsequent steps of the method, the LSB is written to the working register at the same time that the MSB is forwarded to the DRAM to avoid incurring the delay of reading the LSB from the DSP memory during the subsequent transfer of the LSB to the DRAM. Second, transfer the LSB of the second word ($S_{0R}$(LSB)) from the DSP memory to the LSB of the second working register (temp_data1 ) (step 142). Concurrently, transfer the MSB of the second word ($S_{0R}$(MSB)) from the DSP memory to a second address (address 1) in the DRAM. Third, transfer the MSB of the third word ($S_{1L}$(MSB)) from the DSP memory to the third working register (temp_data2) (step 144). Concurrently, transfer both the LSB of the third word ($S_{1L}$(LSB)) from the DSP memory and the LSB of the first working register to a third address (address 2) in the DRAM. Fourth, transfer both the LSB of the fourth word ($S_{1R}$(LSB)) from the DSP memory and the LSB of the second working register to a fourth address (address 3) in the DRAM (step 146). Fifth, transfer the contents of the third working register to the fifth address (address 4) in the DRAM (step 148). Lastly, transfer the MSB of the fourth word ($S_{1R}$(MSB)) from the DSP memory to the sixth address (address 5) in the DRAM (step 149). In this embodiment of the present invention, the LSB of a word comprises the bits [7:0] and the MSB of a word comprises the bits [23:8].

Figure 5:
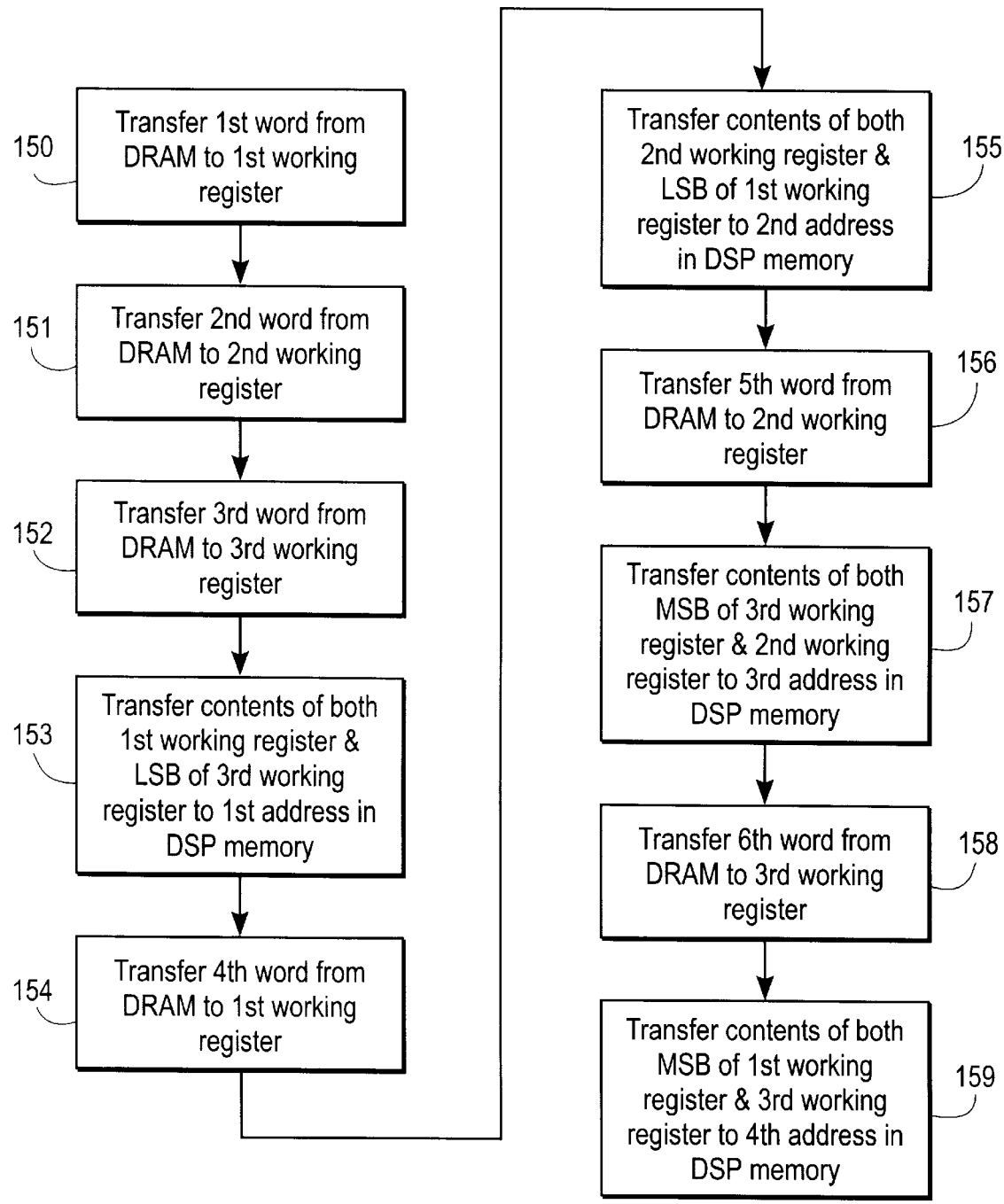
FIG. 5 is a flow chart of the steps in a method for transferring a block of data from the DRAM to the DSP memory in accordance with the present invention.

FIG. 5 shows the steps of a method for transferring a block of data in the AC-3 format from the DRAM 115 to the DSP memory 111 (i.e., a DRAM read) in accordance with the present invention. The method converts the block of data from the packed format to the unpacked format and comprises the following steps. First, transfer a first word at a first address (address 0) from the DRAM to the first working register (step 150). Second, transfer a second word at a second address (address 1) from the DRAM to the second working register (step 151). Third, transfer a third word at a third address (address 2) from the DRAM to the third working register (step 152). Fourth, transfer the contents of both the first working register and the LSB of the third working register to a first address (address 0) in the DSP memory (step 153). Fifth, transfer a fourth word at a fourth address (address 3) from the DRAM to the first working register (step 154). Sixth, transfer the contents of both the second working register and the LSB of the first working register to a second address (address 1) in the DSP memory (step 155). Seventh, transfer a fifth word at a fifth address (address 4) from the DRAM to the second working register (step 156). Eighth, transfer the contents of both the MSB of the third working register and the second working register to a third address (address 2) in the DSP memory (step 157). Ninth, transfer a sixth word at a sixth address (address 5) from the DRAM to the third working register. Lastly, transfer the contents of both the MSB of the first working register and the third working register to a fourth address (address 3) in the DSP memory (Step 159). In this embodiment of the present invention, the MSB of the first working register comprises the bits [15:8].

Figure 6:
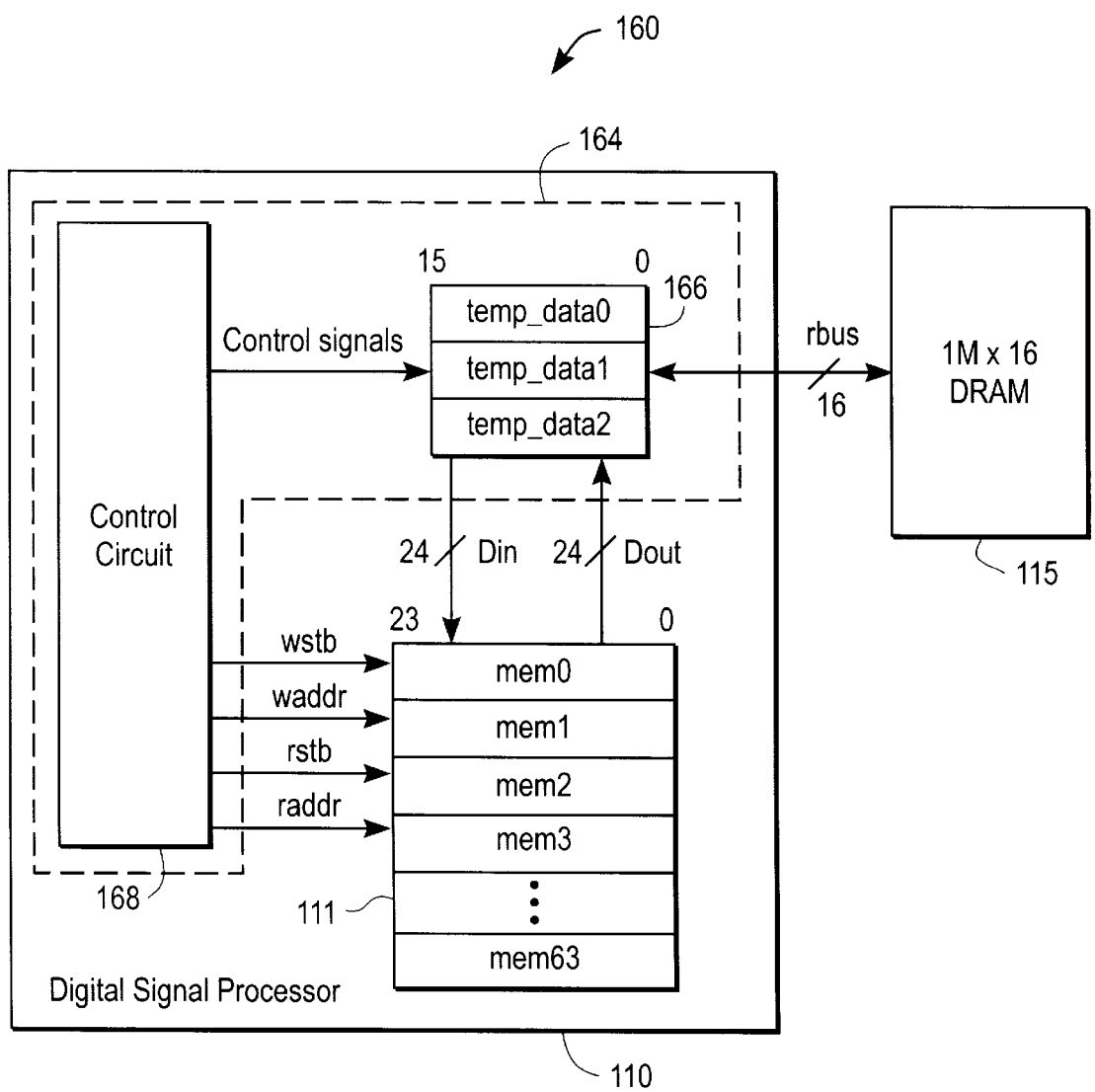
FIG. 6 is a block diagram of a digital signal processing system in accordance with the present invention, including a digital signal processor and a DRAM.

FIG. 6 is a block diagram of a digital signal processing (DSP) system 160 in accordance with the present invention. The DSP system 160 includes a digital signal processor (DSP) 162, a 16-bit DRAM 115 and a 16-bit data bus, rbus, for transferring data between the DSP and DRAM. The DSP 162 contains a DSP memory 111 and a data transfer circuit 164. Other parts of the DSP 162 not pertinent to the invention are not shown in the figure.

The DSP memory 111 contains 64 addresses for storing 64 24-bit wide words: mem0–mem63. The DSP memory includes a write port for receiving data from a 24-bit input data bus $D_{in}$ and a read port for outputting data to a 24-bit output data bus $D_{out}$. A write strobe signal wstb on line 172 initiates a write operation in the DSP memory when asserted. A write address waddr on bus 173 specifies the address to write the data received on the input data bus $D_{in}$. A read strobe signal rstb on line 174 initiates a read operation in the DSP memory when asserted. A read address raddr on bus 175 specifies the address to read the data from for output to the output data bus $D_{out}$.

The data transfer circuit 164 transfers blocks of data between the DSP memory 111 and the DRAM 115 according to the method of FIGS. 4 and 5, described earlier. The data transfer circuit 164 comprises a working register circuit 166 and a control circuit 168. The working register circuit 166, which includes the working registers temp_data0, temp_data1 and temp_data2, is connected to the data buses $D_{in}$, $D_{out}$ and rbus for routing data between the DSP memory 111 and the DRAM 115.

The control circuit 168 comprises logic circuitry for controlling the operation of the DSP memory 111 and the working register circuit 166 during the transfer of blocks of data between the DSP memory 111 and the DRAM 115. The control circuit 168 generates the signals wstb, waddr, rstb and raddr that control the read and write operations of the DSP memory 111, as previously described. The control circuit 168 also outputs various control signals, described below, that control the working register circuit 166.

Figure 7:
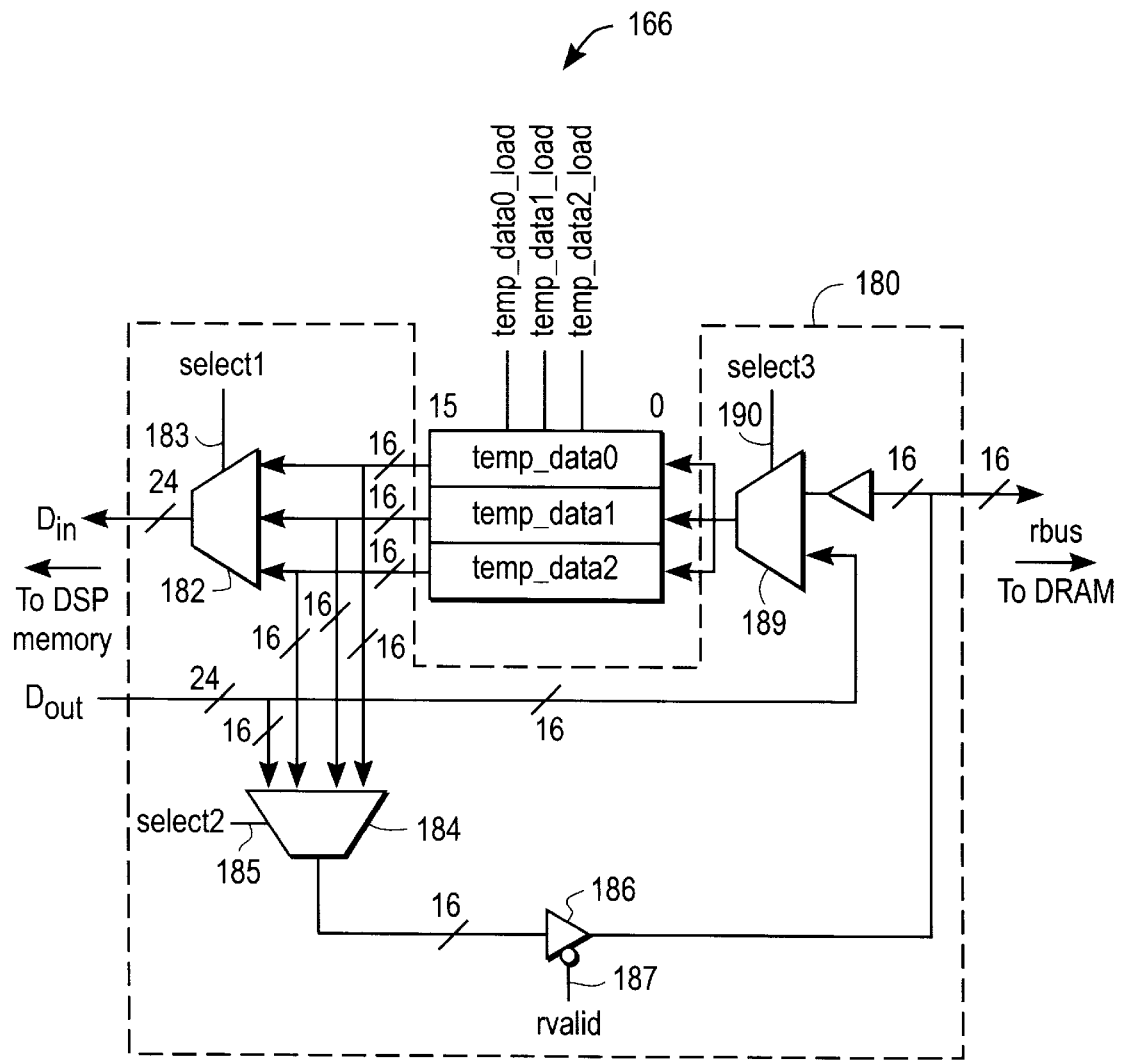
FIG. 7 is a circuit diagram of the working register circuit of FIG. 6, including a set of working registers and a data routing circuit.

FIG. 7 shows a circuit diagram of the working register circuit 166. The working register circuit 166 comprises the above-described working registers temp_data0, temp_data1 and temp_data2 and a data routing circuit 180. The control signals temp_data0_load, temp_data2_load and temp_data2_load on lines 177–179 initiate loads (i.e., writes) of the working registers temp_data0, temp_data1 and temp_data2, respectively. The data routing circuit 180 routes data between the working registers and the data buses $D_{in}$, $D_{out}$ and rbus during data transfers between the DSP memory 111 and the DRAM 115. In the embodiment shown in the figure, the data routing circuit 180 includes a multiplexer 182 controlled by a signal select1 on line 183 for selecting the appropriate data from the three working registers for output to the input data bus $D_{in}$. The illustrated data routing circuit also includes a multiplexer 184 controlled by a signal select2 on line 185 for selecting data from either the three working registers or the output data bus $D_{out}$ connected to the DSP memory 111 for output to the bus rbus, as controlled by a tri-state buffer 186 gated by a signal rvalid on line 187. The data routing circuit shown further includes a multiplexer 189 controlled by a signal select3 on line 190 for selecting data from either the output data bus $D_{out}$ or the bus rbus for writing to one of the working registers temp_data0, temp_data1 or temp_data2. The control signals temp_data0_load, temp_data1_load, temp_data2_load, select1, select2, select3 and rvalid used to control the working register circuit 166 are generated by the control circuit 168. It should be noted that the embodiment of the data routing circuit 180 shown in FIG. 7 is merely provided as an illustration; the circuit may be implemented in other ways that will be apparent to those skilled in the art.

Figure 8:
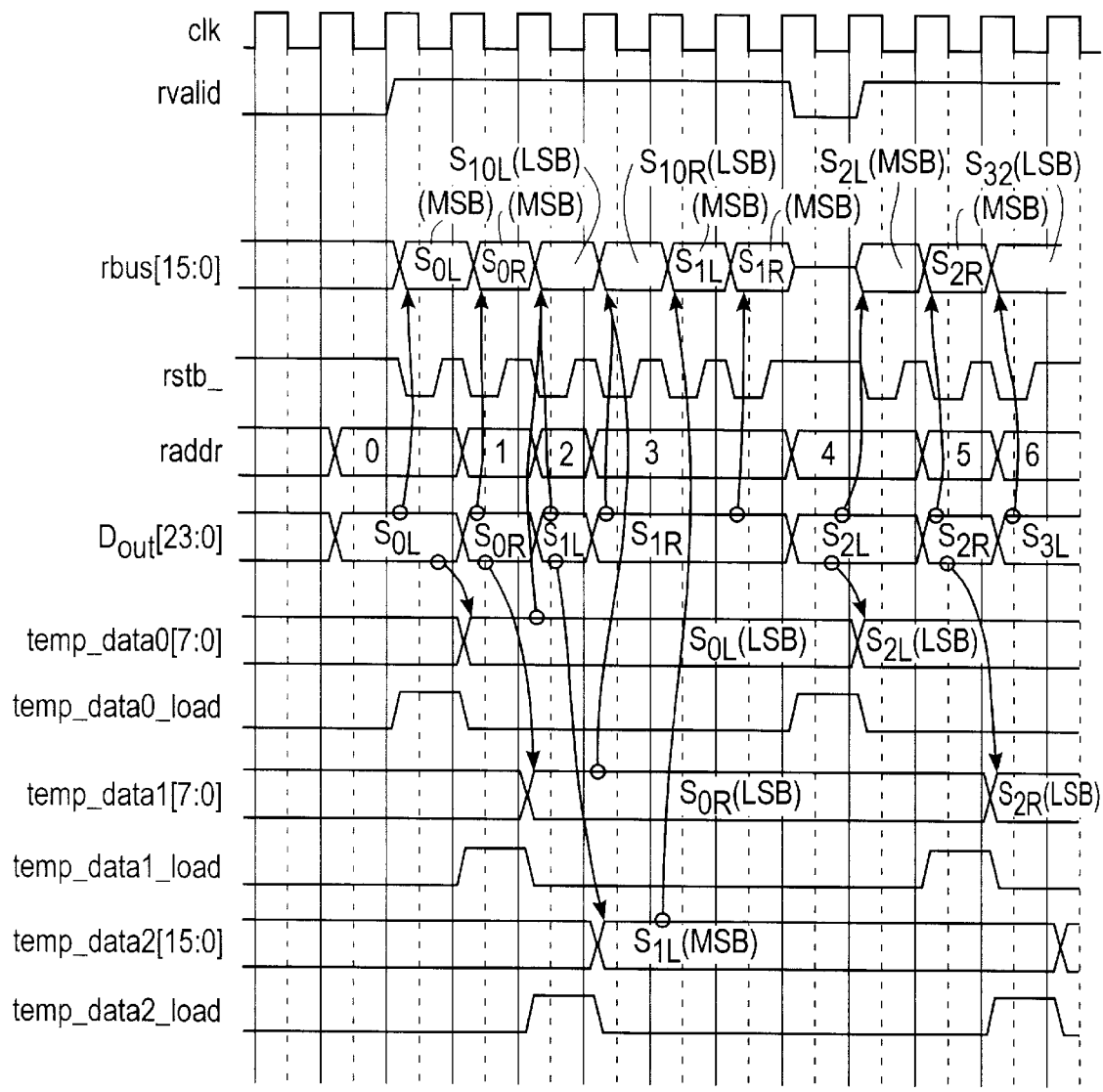
FIG. 8 is a timing diagram illustrating the operation of the circuit of FIG. 6 for the transfer of a block of data from the DSP memory to the DRAM.

FIG. 8 is a timing diagram illustrating the signals generated by the data transfer circuit 164 when transferring a block of data from the DSP memory 111 to the DRAM 115 (i.e., DRAM write). The beginning of a second write operation is also shown (the idle cycle between the first and second write operations is not necessary and is merely included for clarity). The sequence of waveforms in the timing diagram correspond to the steps in the method of FIG. 4. The arrows indicate the transfer of data from one signal to another. As seen from the timing diagram, the data transfer circuit 164 performs the write operation with a very low latency: data is transferred from either the bus $D_{out}$ or the working registers temp_data0, temp_data1 and temp_data2 to the bus rbus as soon as the complete data becomes available. For example, the data $S_{10L}$(LSB), which represents $S_{1L}$(LSB)||$S_{0L}$(LSB), is output to the bus rbus very soon after the data $S_{1L}$(LSB) appears on the output data bus $D_{out}$. As also seen from the diagram, the data transfer circuit 164 performs the write operation with the highest possible throughput: one 16-bit data word is output to the bus rbus for writing to the DRAM 115 on every clock cycle.

Figure 9:
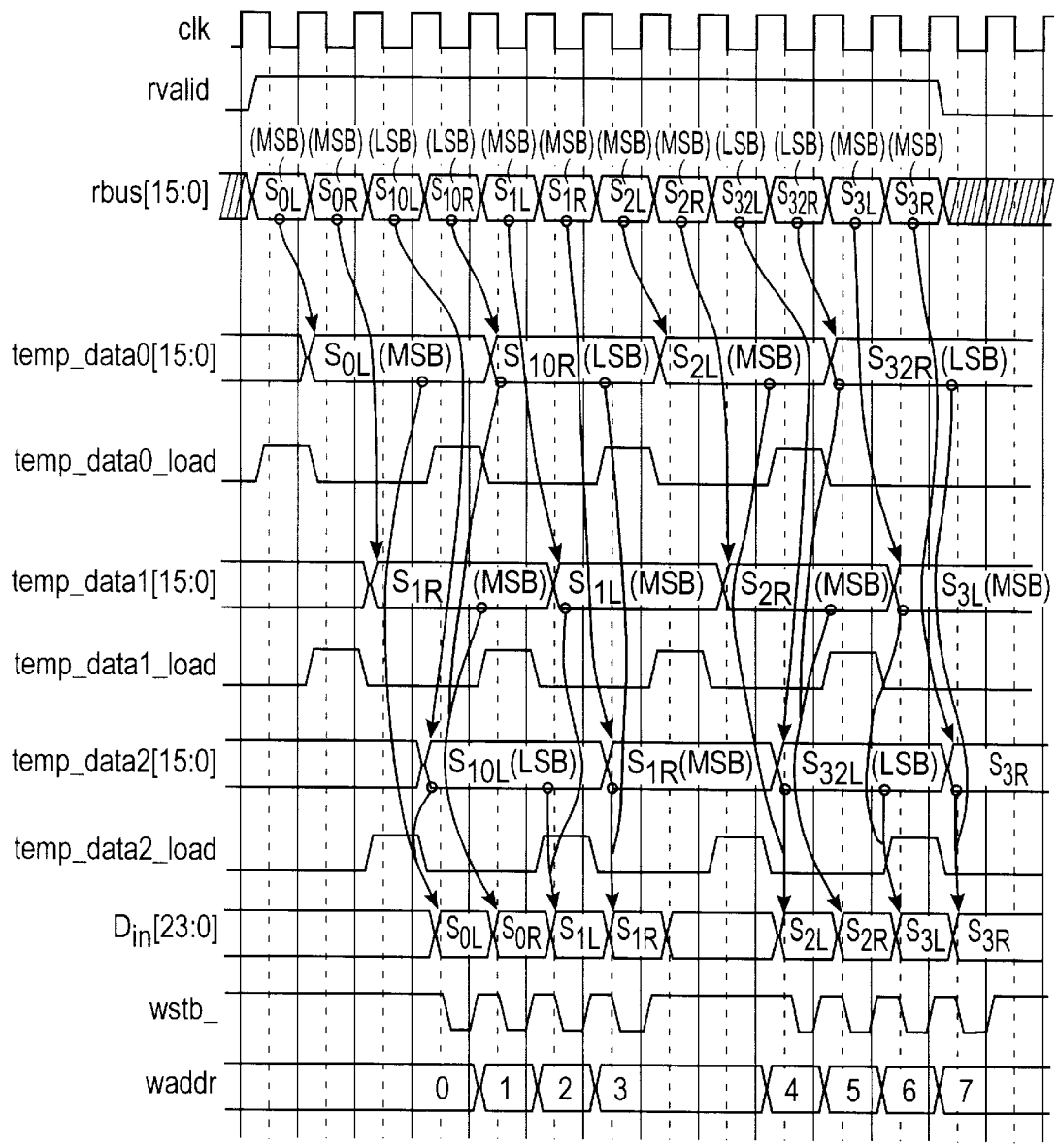
FIG. 9 is a timing diagram illustrating the operation of the circuit of FIG. 6 for the transfer of a block of data from the DRAM to the DSP memory.

FIG. 9 is a timing diagram illustrating the signals generated by the data transfer circuit 164 when transferring a block of data from the DRAM 115 to the DSP memory 111 (i.e., DRAM read). A second read operation is also shown. The sequence of waveforms in the timing diagram correspond to the steps in the method of FIG. 5. As seen from the timing diagram, the data transfer circuit 164 performs the read operation with a relatively low latency: data is transferred from the working registers temp_data0, temp_data1 and temp_data2 to the bus $D_{in}$ soon after the complete data becomes available. For example, the data $S_{0L}$ is output to the bus $D_{in}$ shortly after the data $S_{10L}$(LSB) appears on the bus rbus. As also seen from the diagram, the data transfer circuit 164 performs the read operation with the highest possible throughput: one 24-bit data word is output to the bus $D_{in}$ for writing to the DSP memory 111 on every clock cycle.

In summary, the apparatus and method of the present invention transfers blocks of data between memories having different word widths with a low latency and the highest possible throughput. The present invention achieves this by using the set of working registers to temporarily store and manipulate portions of the blocks of data as they are being transferred between the memories.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. An apparatus for transferring a block of data between a first storage area in a first format and a second storage area in a second format, wherein said first format consists of a plurality of $w_1$-bit wide words and said second format consists of a plurality of $w_2$-bit wide words, where $w_1 > w_2$, said apparatus comprising:

a plurality of working registers, each working register having a word width of at least $w_2$ bits;

a data routing circuit coupled to said first storage area, said second storage area and said working registers to route said block of data therebetween; and a control circuit coupled to said first storage area, said second storage area, said working registers and said data routing circuit to control said transfer of said block of data between said first and second storage areas;

wherein, when transferring said block of data from said first storage area to said second storage area, said data routing circuit and said control circuit are jointly configured to:

concurrently transfer a first portion of a first word from said first storage area to a first location in said second storage area and a second portion of said first word from said first storage area to a first working register; and transfer both a portion of a second word from said first storage area and the contents of a portion of said first working register to a second location in said second storage area; and wherein, when transferring said block of data from said second storage area to said first storage area, said data routing circuit and said control circuit are jointly configured to transfer the contents of both a second working register and a portion of a third working register to a location in said first storage area.

2. The apparatus of claim 1, wherein:

said first storage area is a first memory having a word width of $w_1$ bits;

said second storage area is a second memory having a word width of $w_2$ bits;

said plurality of working registers each have a word width of $w_2$ bits;

said first portion of said first word from said first storage area comprises the m most significant bits of said word, where $(w_1 - w_2/2) \leq m \leq w_2$;

said second portion of said first word from said first storage area comprises the l least significant bits of said word, where $(w_1 - w_2) \leq l \leq w_2/2$;

said portion of said second word from said first storage area comprises the l least significant bits of said word;

said portion of said first working register comprises the l least significant bits of said register; and said portion of said third working register comprises either the l most significant bits or the l least significant bits of said register.

3. The apparatus of claim 2, wherein:

said block of data is in a Dolby Digital AC-3 audio format;

said first memory is a memory in a digital signal processor;

said second memory is a dynamic random access memory;

said word width $w_1$ is 24 bits;

said word width $w_2$ is 16 bits;

said most significant bits m is 16 bits; and said most significant or least significant bits l is eight bits.

4. A method for transferring a block of data from a first storage area in a first format to a second storage area in a second format, wherein said first format consists of a plurality of $w_1$-bit wide words and said second format consists of a plurality of $w_2$-bit wide words, where $w_1 > w_2$, said method comprising the steps of:

transferring a first portion of a first word from said first storage area to a first location in said second storage area;

concurrently with said transferring step, transporting a second portion of said first word from said first storage area to a first working register; and moving both a first portion of a third word from said first storage area and the contents of a portion of said first working register to a third location in said second storage area.

5. The method of claim 4, wherein said first format of said first storage area consists of four $w_1$-bit wide words and said second format of said second storage area consists of six $w_2$-bit wide words, where $(\frac{2}{3} * w_1) \leq w_2 < w_1$, said method further comprising the steps of:

between said transporting step and said moving step, relocating, in a first relocating step, a first portion of a second word from said first storage area to a second location in said second storage area;

concurrently with said first relocating step, relocating, in a second relocating step, a second portion of said second word from said first storage area to a second working register;

concurrently with said moving step, relocating, in a third relocating step, a second portion of said third word from said first storage area to a third working register;

after said moving step, relocating, in a fourth relocating step, both a first portion of a fourth word from said first storage area and the contents of a portion of said second working register to a fourth location in said second storage area;

relocating, in a fifth relocating step, the contents of said third working register to a fifth location in said second storage area; and relocating, in a sixth relocating step, a second portion of said fourth word from said first storage area to a sixth location in said second storage area.

6. The method of claim 5, wherein:

said transferring step comprises transferring the m most significant bits of a first word from a first memory having a word width of $w_1$ bits to a first location in a second memory having a word width of $w_2$ bits, where $(w_1 - w_2/2) \leq m \leq w_2$;

said transporting step comprises transporting the 1 least significant bits of said first word from said first memory to a first working register having a word width of $w_2$ bits, where $(w_1-w_2) \leq 1 \leq (w_2/2)$;

said first relocating step comprises relocating the m most significant bits of a second word from said first memory to a second location in said second memory;

said second relocating step comprises relocating the 1 least significant bits of said second word from said first memory to a second working register having a word width of $w_2$ bits;

said moving step comprises moving both the 1 least significant bits of a third word from said first memory and the 1 least significant bits of said first working register to a third location in said second memory;

said third relocating step comprises relocating the m most significant bits of said third word from said first memory to a third working register having a word width of $w_2$ bits;

said fourth relocating step comprises relocating both the 1 least significant bits of said fourth word from said first memory and the 1 least significant bits of said second working register to a fourth location in said second memory;

said fifth relocating step comprises relocating the contents of said third working register to a fifth location in said second memory; and said sixth relocating step comprises relocating the m most significant bits of said fourth word from said first memory to a sixth location in said second memory.

7. A method for transferring a block of data from a second storage area in a second format to a first storage area in a first format, wherein said first format consists of a plurality of $w_1$-bit wide words and said second format consists of a plurality of $w_2$-bit wide words, where $w_1 > w_2$, said method comprising the steps of:

transferring a first word from said second storage area to a first working register;

transporting a third word from said second storage area to a third working register;

moving the contents of both said first working register and a first portion of said third working register to a first location in said first storage area, wherein said first format of said first storage area consists of four $w_1$-bit wide words and said second format of said second storage area consists of six $w_2$-bit wide words, where $(2/3 \cdot w_1) \leq w_2 \leq w_1$, said method further comprising the steps of:

between said transferring step and said transporting step, relocating, in a first relocating step, a second word from said second storage area to a second working register;

after said moving step, relocating, in a second relocating step, a fourth word from said second storage area to said first working register;

relocating, in a third relocating step, the contents of both said second working register and a first portion of said first working register to a second location in said first storage area;

relocating, in a fourth relocating step, a fifth word from said second storage area to said second working register;

relocating, in a fifth relocating step, the contents of both a second portion of said third working register and said second working register to a third location in said first storage area;

relocating, in a sixth relocating step, a sixth word from said second storage area to said third working register; and relocating, in a seventh relocating step, the contents of both a second portion of said first working register and said third working register to a fourth location in said first storage area.

8. The method of claim 7, wherein:

said transferring step comprises transferring a first word from a second memory having a word width of $w_2$ bits to a first working register having a word width of $w_2$ bits;

said first relocating step comprises relocating a second word from said second memory to a second working register having a word width of $w_2$ bits;

said transporting step comprises transporting a third word from said second memory to a third working register having a word width of $w_2$ bits;

said moving step comprises moving both the contents of said first working register and the 1 least significant bits of said third working register to a first location in a first memory having a word width of $w_1$ bits, where $(w_1-w_2) \leq 1 \leq (w_2/2)$;

said second relocating step comprises relocating a fourth word from said second memory to said first working register;

said third relocating step comprises relocating both the contents of said second working register and the 1 least significant bits of said first working register to a second location in said first memory;

said fourth relocating step comprises relocating a fifth word from said second memory to said second working register;

said fifth relocating step comprises relocating both the m most significant bits of said third working register and the contents of said second working register to a third location in said first memory, where $(w_1-w_2/2) \leq m \leq w_2$;

said sixth relocating step comprises relocating a sixth word from said second memory to said third working register; and said seventh relocating step comprises relocating both the m most significant bits of said first working register and the contents of said third working register to a fourth location in said first memory.

* * * * *